United States Patent
Jang et al.

(10) Patent No.: US 8,332,069 B2
(45) Date of Patent: Dec. 11, 2012

(54) FAULT TOLERANCE METHOD AND APPARATUS FOR ROBOT SOFTWARE COMPONENT

(75) Inventors: Choul Soo Jang, Daejeon (KR); Seung-Woog Jung, Daejeon (KR); Byoung Youl Song, Daejeon (KR); Sung Hoon Kim, Daejeon (KR); Joong Bae Kim, Daejeon (KR); Kyeong Ho Lee, Daejeon (KR); Hyun Kyu Cho, Daejeon (KR); Myung Chan Roh, Daejeon (KR); Joong-Ki Park, Daejeon (KR); Chang Eun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

(21) Appl. No.: 12/843,513

(22) Filed: Jul. 26, 2010

(65) Prior Publication Data

US 2011/0153073 A1 Jun. 23, 2011

(30) Foreign Application Priority Data

Dec. 18, 2009 (KR) .................. 10-2009-0126638

(51) Int. Cl.
*G06F 19/00* (2011.01)
(52) U.S. Cl. .......... 700/245; 700/11; 700/17; 700/95; 700/248; 700/249; 700/250; 700/258; 700/260; 700/262; 714/38.13; 714/38.14; 901/45; 717/107; 717/124; 701/36
(58) Field of Classification Search .......... 700/11, 700/17, 95, 245, 248, 249, 250, 258, 260, 700/262; 707/999.01, 999.102, 999.202; 714/38.13, 38.14, E11.208; 717/107, 124; 356/237.1, 601; 705/35; 1/1; 709/224; 901/45; 701/36; 710/104; 345/156
See application file for complete search history.

(56) References Cited

U.S. PATENT DOCUMENTS

| | | | | |
|---|---|---|---|---|
| 6,487,500 | B2 * | 11/2002 | Lemelson et al. | 701/301 |
| 6,748,556 | B1 | 6/2004 | Storino et al. | |
| 7,211,980 | B1 * | 5/2007 | Bruemmer et al. | 318/587 |
| 7,584,020 | B2 * | 9/2009 | Bruemmer et al. | 700/245 |
| 7,587,260 | B2 * | 9/2009 | Bruemmer et al. | 700/253 |
| 7,620,477 | B2 * | 11/2009 | Bruemmer | 700/245 |
| 7,668,621 | B2 * | 2/2010 | Bruemmer | 700/245 |
| 7,801,644 | B2 * | 9/2010 | Bruemmer et al. | 700/249 |
| 7,926,035 | B2 * | 4/2011 | Musuvathi et al. | 717/124 |
| 7,974,738 | B2 * | 7/2011 | Bruemmer et al. | 700/255 |
| 8,073,564 | B2 * | 12/2011 | Bruemmer et al. | 700/245 |
| 2011/0054689 | A1 * | 3/2011 | Nielsen et al. | 700/258 |

FOREIGN PATENT DOCUMENTS

| | | |
|---|---|---|
| KR | 2002-0014694 | 2/2002 |
| KR | 10-2007-0053581 | 5/2007 |
| KR | 10-2008-0072335 | 8/2008 |
| KR | 10-2008-0073414 | 8/2008 |

\* cited by examiner

*Primary Examiner* — James Trammell
*Assistant Examiner* — McDieunel Marc
(74) *Attorney, Agent, or Firm* — Staas & Halsey LLP

(57) ABSTRACT

An apparatus for performing fault tolerance against a failure occurring during driving robot software components includes: a component executor for executing the robot software components, which are assigned with one thread from an operating system and have a same priority and cycle, by using the assigned thread; and an executor monitor for periodically monitoring the operation of the component executor and determining whether or not there is a failure in the robot software components executed by the component executor. The apparatus further includes: an executor manager for generating the component executor which is assigned with the robot software components having the same priority and cycle and, when the executor monitor determines that there is a failure in the execution of the robot software components, generating a new component executor.

20 Claims, 3 Drawing Sheets

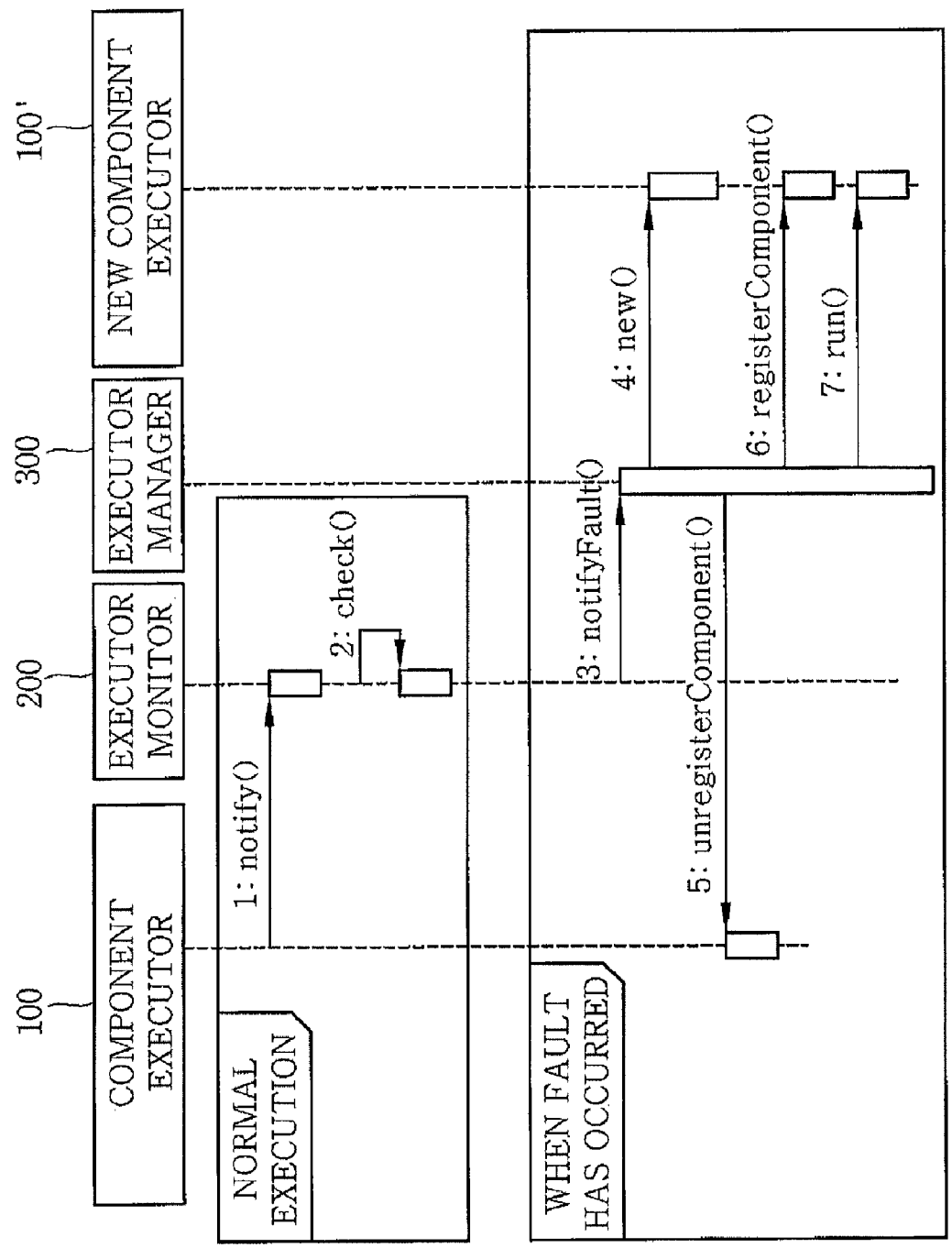

FAULT TOLERANCE METHOD AND APPARATUS FOR ROBOT SOFTWARE COMPONENT

CROSS-REFERENCE(S) TO RELATED APPLICATION

The present invention claims priority of Korean Patent Application No. 10-2009-0126638, filed on Dec. 18, 2009, which is incorporated herein by reference.

FIELD OF THE INVENTION

The present invention relates to an apparatus which prevents a failure in a specific component from spreading to the entire system when executing multiple components in a component executing method for driving robot software components loosely coupled in a distributed environment.

BACKGROUND OF THE INVENTION

A robot software component is a reusable and replaceable software module. An external component user uses only the interface provided by the component, and can construct a robot application only by combining components without knowledge of the detailed implementation of the corresponding interface.

Robot components used for a robot software configuration have their respective internal states and operate in an individual manner, and robot control is achieved by data exchange and method invocation performed among the components through the component interfaces. In recent years, in order to support these characteristics of the robot, Open Robot Control Software (OROCOS), Robot Technology Component (RTC) and the like suggest a robot programming method using a component in a form of an active pattern.

In order to drive robot software components, the components are executed in a given cycle using threads of an operating system. However, the number of components used for the robot is large because the robot uses various devices and algorithms. In this case, if each component is assigned one thread for use, the system resources of the operating system are wasted and thread context switching frequently occurs, thereby degrading system performance.

Therefore, in the prior art like OROCOS, components of a same cycle are processed by one thread in order to prevent degradation of system performance caused by the assignment of a thread for each component, thereby preventing degradation of system performance.

In this manner, in case a number of components are processed by one thread, components registered in the corresponding thread are sequentially processed in each cycle.

However, in case there occurs a failure in a specific component during sequential processing of components registered in one thread or all the components cannot be executed within a given cycle because the execution time of the components is extended, the execution of other components is also disturbed. As a result, a failure in one component causes an abnormality in the operation of the entire robot system.

SUMMARY OF THE INVENTION

The present invention provides a method and apparatus capable of preventing a failure in a specific component from spreading to the entire system while maintaining system performance when executing multiple robot software components.

In accordance with an aspect of the present invention, there is provided an apparatus for performing fault tolerance against a failure occurring during driving robot software components.

The apparatus includes: a component executor for executing the robot software components, which are assigned with one thread from an operating system and have a same priority and cycle, by using the assigned thread; an executor monitor for periodically monitoring the operation of the component executor and determining whether or not there is a failure in the robot software components executed by the component executor; and an executor manager for generating the component executor which is assigned with the robot software components having the same priority and cycle and, when the executor monitor determines that there is a failure in the execution of the robot software components, generating a new component executor.

In accordance with another aspect of the present invention, there is provided a method for performing fault tolerance against a failure occurring during driving robot software components.

The method includes: assigning robot software components having a same priority and cycle to a component executor; executing, on the component executor, the robot software components by using a thread assigned to the components from an operating system; notifying an executor monitor of the execution result; and determining, by the executor monitor, whether or not a failure has occurred during the execution of the robot software components, and generating a new component executor by an executor manager if it is determined that there is a failure during the execution of robot software components.

BRIEF DESCRIPTION OF THE DRAWINGS

The above and other objects and features of the present invention will become apparent from the following description of embodiments, given in conjunction with the accompanying drawings, in which:

FIG. 3 is a flowchart illustrating a sequential flow for performing fault tolerance against a failure occurring during driving of a component when driving robot software components in accordance with the embodiment of the present invention.

DETAILED DESCRIPTION OF THE EMBODIMENT

Hereinafter, an embodiment of the present invention will be described in detail with reference to accompanying drawings which form a part hereof.

Figure 1:
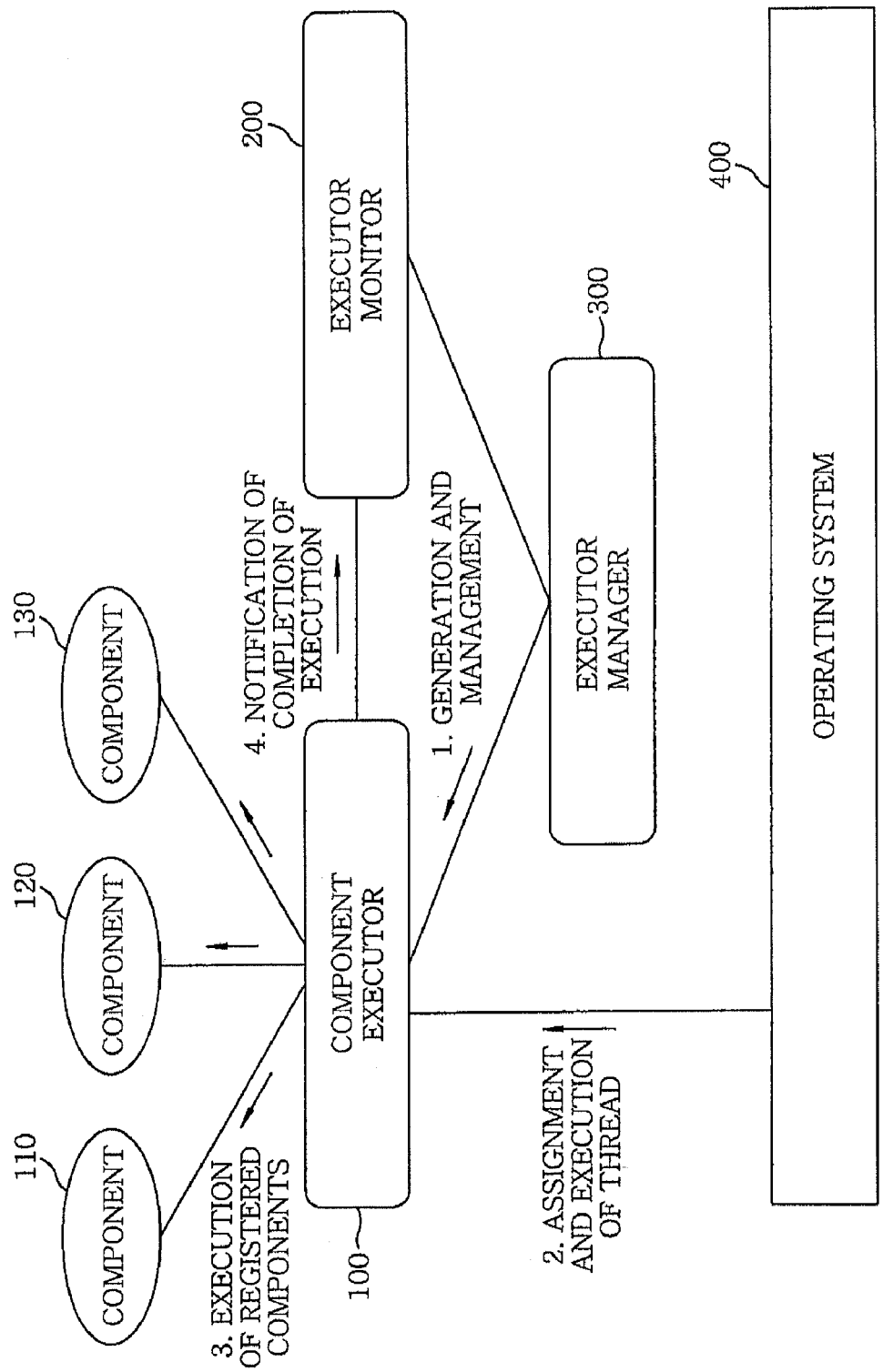
FIG. 1 is a block diagram conceptually showing the configuration of an apparatus for performing fault tolerance against a failure occurring during driving of a component when driving robot software components in accordance with an embodiment of the present invention.
Figure 2:
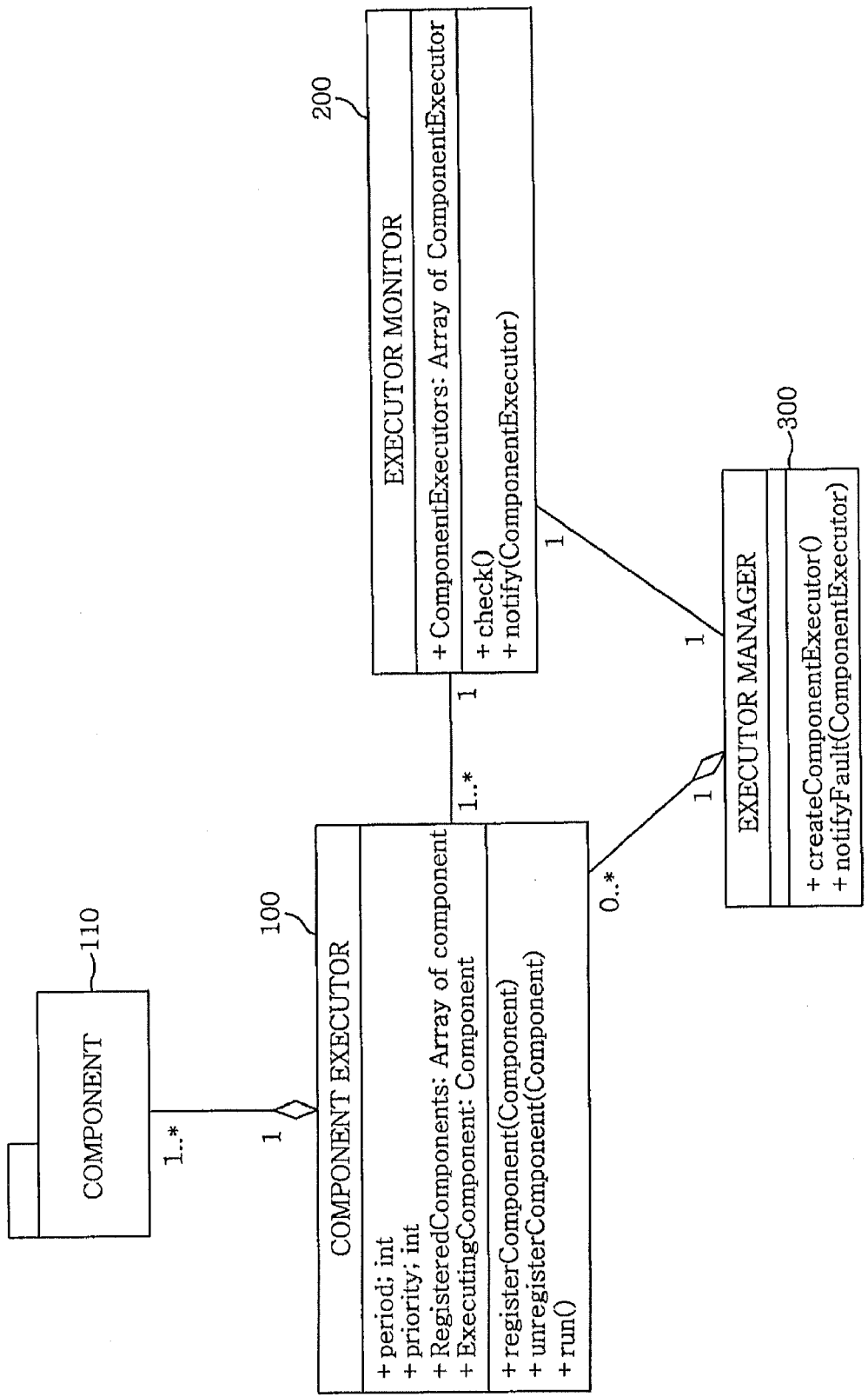
FIG. 2 is a block diagram illustrating the interfaces and internal data structure of the apparatus for performing fault tolerance in accordance with the embodiment of the present invention.

FIG. 1 is a block diagram conceptually showing a configuration of an apparatus for performing fault tolerance against a failure occurring during driving a component when driving robot software components in accordance with an embodiment of the present invention. FIG. 2 is a class diagram illustrating interfaces and internal data structure of the fault tolerance apparatus shown in FIG. 1.

Referring to FIGS. 1 and 2, the apparatus for performing fault tolerance against a failure occurring during driving of a component when driving robot software components includes a component executor 100 for executing robot software components 110, which are assigned with one thread from an operating system and have a same priority and cycle, by using the assigned thread and an executor monitor 200 for periodically monitoring the operation of the component executor 100 and determining whether or not there is a failure in the robot software component executed by the component executor 100.

The apparatus further includes an executor manager 300 for generating the component executor 100 for executing the robot software components having the same priority and cycle and, when the executor monitor 200 determines that there is a failure in the operation of the component executor 100.

In order to execute the robot software components with the assigned thread from the operating system, a medium for connecting between the thread and the components is required. In the embodiment of the present invention, the component executor 100 serves for assigning the thread from the operating system and registering robot software components thereto to thereby execute the components by the assigned thread.

The component executor 100 is generated by the executor manager 300, and the executor monitor 200 monitors the execution of components. The interfaces and internal data structures of the component executor 100, the executor monitor 200, and the executor manager 300 are shown in the class diagram of FIG. 2.

Since the component executor 100 has a priority and a cycle, components having a same priority and cycle to those of the component executor 100 are registered in the same component executor and executed. In case where there is a number of component executors, priorities and cycles set in the component executors are applied in the scheduling policy of a real time operating system (RTOS).

FIG. 3 is a flowchart showing a sequential flow for performing a fault tolerance method against a failure occurring during driving of a component when driving robot software components in accordance with the embodiment of the present invention.

Referring to FIG. 3, when a cycle of the component executor 100, the cycle preset based on the scheduling of the operating system, comes, the component executor 100 sequentially executes the components registered therein by its own thread. At this time, while the components are being sequentially executed, information on the components to be executed is stored in the component executor 100. Upon completion of one cycle after the sequential execution of the registered components has done, the component executor 100 notifies the executor monitor 200 of completion of execution at step 1.

The executor monitor 200 continuously monitors whether or not the notification of completion of execution is transmitted from the component executor 100 according to the preset cycle at step 2. If no notification of completion of execution is transmitted from the component executor 100 for a preset number of the preset cycles, it is determined that a failure has occurred in the component executor 100 which executed the components, and the occurrence of the failure is notified to the executor manager 300 at step 3.

Then, the executor manager 300 which has been notified of the occurrence of the failure generates a new component executor 100' having the same priority and cycle as the component executor 100 at step 4. In addition, the executor manager 300 finds out a component which was being execute by the existing component executor 100 when the failure occurred by referring to the information stored in the component executor 100. Then, registers and transfers all the components, except for the component being executed in the component executor 100, to the new component executor 100' at step 6.

Meanwhile, the existing component executor 100 deletes the components have transferred to and registered in the new component executor 100' at step 5. The newly generated component executor 100' registers all the other components except for the failed component, is assigned with a new thread from the operating system, and restarts sequential execution at step 7.

In this manner, the occurrence of a failure is determined by monitoring the operation of the component executor for each cycle, a failed component is quickly detected and a new component executor is generated. Then, a component with a failure is found by using information sequentially stored during a component execution process, and the failed component is selectively excluded. Thereafter, new component execution is performed to thereby quickly and accurately prevent a failure in a specific component from spreading to the entire system.

As described above, in accordance with the method and apparatus for fault tolerance in the execution of robot software components of the present invention, it is possible to prevent a failure in a specific component from spreading to the entire system while maintaining the performance of each of multiple software components.

While the invention has been shown and described with respect to the particular embodiments, it will be understood by those skilled in the art that various changes and modification may be made without departing from the scope of the invention as defined in the following claims.

What is claimed is:

1. An apparatus for performing fault tolerance against a failure occurring during driving robot software components, the apparatus comprising:
    a component executor for executing the robot software components, which are assigned with one thread from an operating system and have a same priority and cycle, by using the assigned thread;
    an executor monitor for periodically monitoring the operation of the component executor and determining whether or not there is a failure in the robot software components executed by the component executor; and
    an executor manager for generating the component executor which is assigned with the robot software components having the same priority and cycle and, when the executor monitor determines that there is a failure in the execution of the robot software components, generating a new component executor.

2. The apparatus of claim 1, wherein when a cycle of the component executor, the cycle having been preset based on a scheduling policy of the operating system and being same as those of the robot software components, comes, the component executor sequentially executes the robot software components by using the assigned thread.

3. The apparatus of claim 2, wherein when executing the robot software components, the component executor sequentially stores information on the robot software components.

4. The apparatus of claim 1, wherein, upon completion of execution of one cycle of the robot software components, the component executor notifies the executor monitor of the completion of execution.

5. The apparatus of claim 4, wherein the executor monitor monitors whether or not the notification of completion of execution is transmitted from the component executor according to the preset cycle.

6. The apparatus of claim 4, wherein when no notification of completion of execution is transmitted from the component executor a preset number of cycles, the executor monitor determines that a failure has occurred in one of the robot software components and notifies the executor manager of the occurrence of the failure.

7. The apparatus of claim 1, wherein, when the executor monitor determines that there is a failure in the execution of the robot software components, the executor manager generates a new component executor having the same priority and cycle as the component executor.

8. The apparatus of claim 1, wherein the component executor sequentially stores information on the robot software components when executing the robot software components, and when the executor monitor determines that there is a failure in the execution of the robot software components, the executor manager determines which component has been failed among the robot software components during the sequential execution by the component executor.

9. The apparatus of claim 8, wherein the executor manager transfers and registers all the other components, except for the failed component which was being executed at the time of the failure, to the new component executor.

10. The apparatus of claim 9, wherein the executor manager deletes the components which have been transferred to and registered in the new component executor from the existing component executor.

11. A method for performing fault tolerance against a failure occurring during driving robot software components, the method comprising:

assigning robot software components having a same priority and cycle to a component executor;

executing, on the component executor, the robot software components by using a thread assigned to the components from an operating system;

notifying an executor monitor of the execution result; and determining, by a processor on the executor monitor, whether or not a failure has occurred during the execution of the robot software components, and generating a new component executor by an executor manager if it is determined that there is a failure during the execution of robot software components.

12. The method of claim 11, wherein when a cycle of the component executor, the cycle having been preset based on a scheduling policy of the operating system and being same as those of the robot software components, comes, said executing sequentially executes the robot software components by using the assigned thread.

13. The method of claim 12, wherein when sequentially executing the robot software components, information on the robot software components is sequentially stored.

14. The method of claim 11, wherein, upon completion of execution of one cycle of the robot software components, the executor monitor is notified of the completion of execution in said notifying.

15. The method of claim 14, wherein a failure in the execution the robot software components is determined depending on whether or not the notification of completion of execution is transmitted according to the preset cycle.

16. The method of claim 14, wherein when no notification of completion of execution is transmitted for a preset number of cycles, it is determined that a failure has occurred in one of the robot software components and notifies the executor manager of the occurrence of the failure.

17. The method of claim 11, further comprising:

when it is determined that there is a failure during the execution of the component executor, generating the new component executor having the same priority and cycle as the component executor.

18. The method of claim 11, wherein said executing sequentially stores information on the robot software components when executing the one robot software components, and if it has been determined that there is a failure during the execution of the robot software components, the method further comprising determining which component has been failed among the robot software components during the execution by the component executor.

19. The method of claim 18, wherein, in said generating, all the other components, except for the component which was being executed at the time of the failure, are transferred to and registered in the new component executor.

20. The method of claim 19, wherein, in said generating, deletes the components which have been to and registered in the new component executor from the existing component executor.

* * * * *